(12) United States Patent
Carlson et al.

(10) Patent No.: US 8,712,912 B2
(45) Date of Patent: Apr. 29, 2014

(54) SYSTEM AND METHOD FOR PROVIDING ADVICE TO CONSUMER REGARDING A PAYMENT TRANSACTION

(75) Inventors: Mark Carlson, Half Moon Bay, CA (US); Shalini Mayor, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 470 days.

(21) Appl. No.: 12/763,899

(22) Filed: Apr. 20, 2010

(65) Prior Publication Data

US 2010/0325047 A1   Dec. 23, 2010

Related U.S. Application Data

(60) Provisional application No. 61/173,371, filed on Apr. 28, 2009, provisional application No. 61/177,784, filed on May 13, 2009.

(51) Int. Cl.
  *G06Q 40/00* (2012.01)
(52) U.S. Cl.
  USPC ............................................... 705/44; 705/35
(58) Field of Classification Search
  USPC ................................................ 705/41, 44, 35
  See application file for complete search history.

(56) References Cited

U.S. PATENT DOCUMENTS

| | | | |
|---|---|---|---|
| 5,708,422 A * | 1/1998 | Blonder et al. | 340/5.41 |
| 5,878,337 A | 3/1999 | Joao et al. | |
| 7,357,310 B2 | 4/2008 | Calabrese et al. | |
| 2002/0095380 A1 | 7/2002 | Singhal | |
| 2007/0118592 A1 * | 5/2007 | Bachenberg | 709/203 |

(Continued)

FOREIGN PATENT DOCUMENTS

| | | |
|---|---|---|
| KR | 10-2002-0012041 A | 2/2002 |
| KR | 10-2005-0046479 A | 5/2005 |
| WO | WO 01/93213 A2 | 12/2001 |
| WO | WO 2009/026318 A2 | 2/2009 |

OTHER PUBLICATIONS

Investment Weekly News; "American Express Travel Related Services Compnay, Inc.; Patent Issued for Post-Authorization Message for a Financial Transaction"; Jul. 21, 2012.*

(Continued)

*Primary Examiner* — Edward Chang
(74) *Attorney, Agent, or Firm* — Kilpatrick Townsend & Stockton

(57) ABSTRACT

Systems, apparatuses, and methods for providing a consumer with an alert or other information regarding a payment transaction. When a consumer conducts a payment transaction, an alert may be sent to a device to enable the consumer to view the alert. The contents of the alert, the triggers for sending the alert, or the delivery channel for the alert may be determined by a set of preferences that the consumer set when registering for the alert service. In response to the alert, the consumer may send an SMS or other message that requests "help", "advice", "need information", etc. In some embodiments, the consumer may select or activate a user interface element that enables them to obtain advice or information regarding the transaction. In some embodiments, a consumer request for help, advice, or more information may be generated by the consumer during or after a payment transaction. In response to the request for help, advice, or information, the invention may provide the consumer with a menu or list of topics of information that is available regarding the transaction.

22 Claims, 10 Drawing Sheets

(56) References Cited

U.S. PATENT DOCUMENTS

2008/0010203 A1  1/2008  Grant
2008/0027808 A1  1/2008  Wilf
2008/0167990 A1* 7/2008  Grant .............................. 705/44
2008/0200144 A1  8/2008  Ginsberg et al.

OTHER PUBLICATIONS

Journal of Engineering; "Mastercard International Incorporated; Patent Issued for Techniques for Authorization of Usage of a Payment Device"; Dec. 4, 2013.*

* cited by examiner

SYSTEM AND METHOD FOR PROVIDING ADVICE TO CONSUMER REGARDING A PAYMENT TRANSACTION

CROSS-REFERENCES TO RELATED APPLICATIONS

This application claims priority from U.S. Provisional Patent Application Nos. 61/173,371, filed Apr. 28, 2009) and 61/177,784, filed May 13, 2009), the contents of which are incorporated herein by reference in their entirety for all purposes.

BACKGROUND

Embodiments of the present invention are directed to systems, apparatuses, and methods for providing a consumer with an alert or other information regarding a payment transaction, and more specifically, to a system and method for enabling a consumer to obtain advice or information regarding a transaction in response to a request from the consumer. The present invention is also directed to systems, apparatuses, and methods for enabling a consumer to conduct a payment transaction using a mobile device, and for providing the consumer with assistance in obtaining advice or information regarding the transaction.

Consumers use payment devices to conduct a variety of different types of transactions, such as for the purchase of goods or services from a merchant or service provider. The payment device may be a debit card, credit card, smart card, or a contactless payment device incorporated into a mobile phone or personal digital assistant (PDA), for example. In some situations, either prior to, during, or after a transaction a consumer may have a question about some aspect of the transaction or desire advice or information about the product or service involved in the transaction. For example, a consumer may make a purchase at a store and then want to know the name of a person they can contact to provide a comment regarding the customer service they received. Another example might be where a consumer wishes to register a newly purchased product for a warranty or rebate and is unsure how to go about that process. Yet another example might be one where a person receives an alert that a transaction has occurred and then wants to know the location or other information regarding the merchant involved in the transaction.

What is desired are a system, apparatus, and method for enabling a consumer to request information or advice regarding an aspect of a payment transaction and to receive a response to that request in a timely manner. Embodiments of the present invention address these and other problems, individually and collectively.

SUMMARY

Embodiments of the present invention are directed to systems, apparatuses, and methods for providing a consumer with an alert or other information regarding a payment transaction, and more specifically, to a system, apparatus, and method for enabling a consumer to obtain information or advice regarding an aspect of the transaction. The present invention is also directed to systems, apparatuses, and methods for enabling a consumer to conduct a payment transaction using a mobile device, and for providing the consumer with assistance in obtaining advice or information regarding the transaction.

Embodiments of the inventive system may include an alert or notification infrastructure that operates to generate an alert or message when a transaction satisfies certain conditions or consumer preferences. The consumer preferences may be set in advance of the transaction using a suitable interface, such as a web-based service interface that is accessible using a client device (such as a mobile phone, PDA, laptop computer or desktop computer). In response to the transaction satisfying the set of conditions or preferences, the system may generate an alert or message and control its delivery to the consumer. Similarly to the generation of the alert, the delivery mechanism may be determined by certain conditions or consumer preferences. The alert or message may contain transaction related data and may provide the consumer with an opportunity to request further information or advice regarding the transaction. The alert or message may also contain a selectable element to enable the consumer to request assistance in obtaining information or advice about the transaction. Selection or activation of the element may result in providing the consumer with a list or menu of topics related to the transaction. The consumer may choose from the list or menu of topics to indicate the advice or information they wish to receive.

In some embodiments, a consumer may respond to a transaction alert with a message requesting additional advice or information, such as a SMS (short message service) message saying "advice", "help", or "need information". In response to the message, the inventive system may provide the consumer with a list or menu of topics of information related to the transaction that are available to the consumer. In some embodiments, the alert may include a field for entry of one or more keywords by the consumer. In response to entering the keyword or keywords, the inventive system may generate a list or menu of topics related to the transaction, where the list or menu includes the keywords. Similarly, the list or menu of topics provided to the consumer may be accompanied by a field for entry of a keyword or keywords to enable the consumer to specify the advice or information they desire in greater detail. In response to the consumer providing a keyword or keywords, the inventive system may process the entered keyword(s) and use them as a filter or query to select the advice or information within the selected category that best fits the request by the consumer.

In some embodiments, a payment processing network may be responsible for generating the transaction alerts and for responding to a consumer's request for advice or information regarding a transaction. The payment processing network may maintain a database of information regarding payment transactions conducted by the consumer and by other consumers, where the information may include data relating to the transactions, the merchants involved in the transactions, the products or services involved in the transactions, the warranty or other value-added services that may be applicable to the products or services, etc. The database may be subjected to various "data mining" or other analysis techniques in order to identify the types of advice or information that may be of use to a consumer and to assist in providing that advice or information to the consumer. Such data mining techniques may include, but are not limited to, neural network processing, pattern matching, statistical analysis, recommendation or collaborative filtering methods, expert system analysis, etc.

In one embodiment, the present invention is directed to an apparatus for processing a payment transaction, where the apparatus includes an electronic processor programmed to execute a set of instructions, a data storage device coupled to the processor, and the set of instructions contained in the data storage device, wherein when the set of instructions are executed by the processor, the apparatus processes the payment transaction by receiving an authorization message for a payment transaction;

processing the authorization message to determine if data contained in the message satisfies a condition specified by a consumer participating in the payment transaction for generating a transaction alert message regarding the payment transaction;

generating the transaction alert message;

providing the transaction alert message to the consumer participating in the payment transaction;

receiving a request from the consumer for additional information regarding the payment transaction;

processing the request from the consumer to determine additional information regarding the payment transaction that can be provided to the consumer; and providing the additional information to the consumer.

In another embodiment, the present invention is directed to a method of processing a payment transaction, where the method includes receiving an authorization message for the payment transaction, processing the authorization message to determine if data contained in the message satisfies a condition specified by a consumer participating in the payment transaction for generating a transaction alert message regarding the payment transaction, generating the transaction alert message, providing the transaction alert message to the consumer participating in the payment transaction, receiving a request from the consumer for additional information regarding the payment transaction, processing the request from the consumer to determine additional information regarding the payment transaction that can be provided to the consumer, and providing the additional information to the consumer.

Other objects and advantages of embodiments of the present invention will be apparent to one of ordinary skill in the art upon review of the detailed description of the present invention and the included figures.

DETAILED DESCRIPTION

Figure 1:
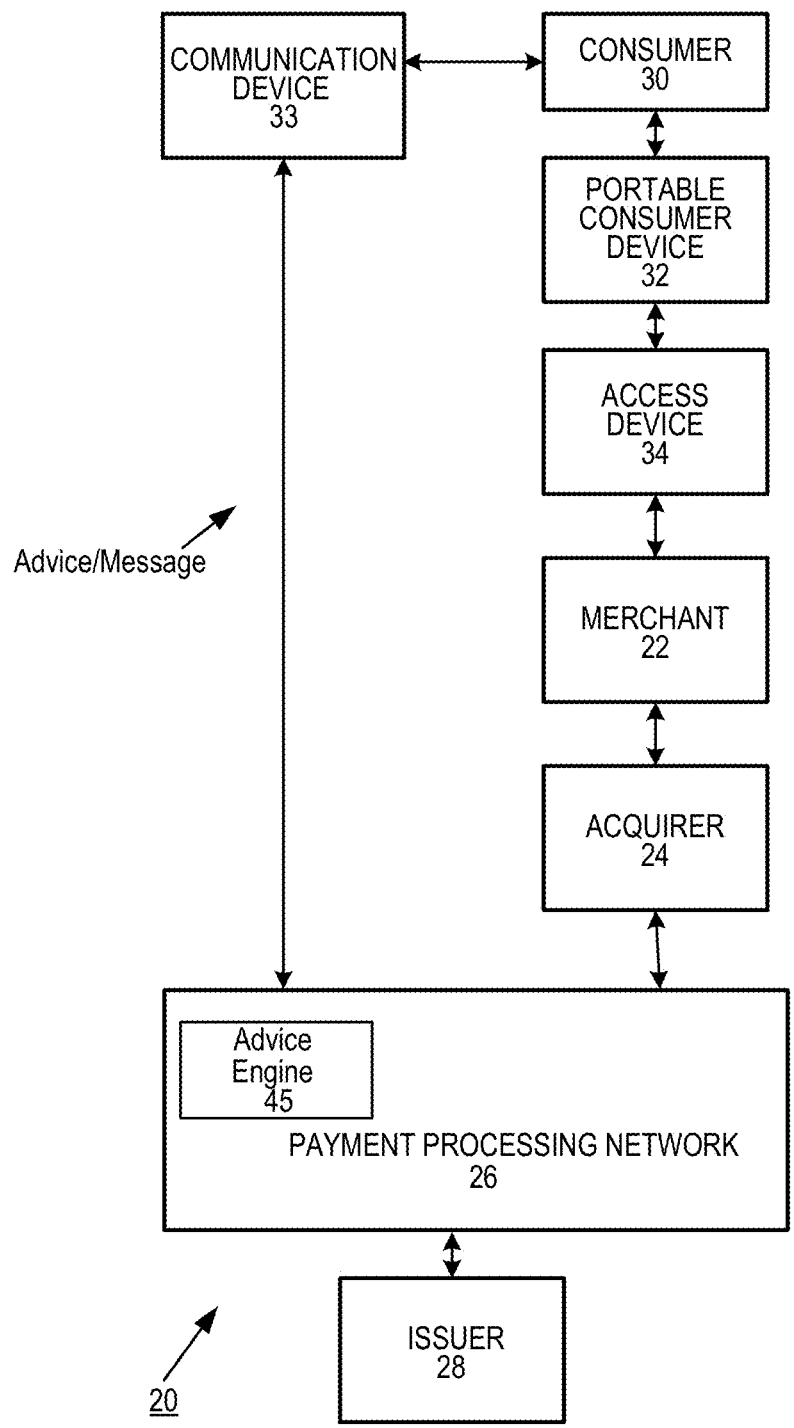
FIG. 1 is a block diagram illustrating the primary functional elements of a system for conducting a payment transaction and for generating advice or information regarding the transaction for a consumer, in accordance with some embodiments of the present invention.

Embodiments of the present invention are directed to systems, apparatuses, and methods for conducting payment transactions. In exemplary embodiments, when a consumer conducts a payment transaction, an alert may be sent to a device to enable the consumer to view the alert. The contents of the alert, the triggers for sending the alert, or the delivery channel for the alert may be determined by a set of preferences that the consumer set when registering for the alert service. In response to the alert, the consumer may send an SMS or other message that requests "help", "advice", "need information", etc. In some embodiments, the consumer may select or activate a user interface element in an alert or message that enables them to obtain advice or information regarding the transaction. In some embodiments, the selectable element may include a data entry field in which a consumer may enter one or more keywords. The keyword or keywords may be used to conduct a query or search, with the results of the query search being used to generate a menu or list of topics or categories of information available to the consumer. The menu or list of topics may be accompanied by a data entry field in which the consumer may enter one or more keywords, with those keyword(s) being used to filter the available information in a selected topic or category before providing it to the consumer. Note that in some embodiments, a consumer request for help, advice, or more information may be generated by the consumer during, at the conclusion of, or sometime after conclusion of a payment transaction.

A SMS or other message requesting advice or information may be generated by the consumer using the keypad of their mobile phone or similar device, or by selecting one of a set of previously generated templates or messages that may be specific to certain topics. If generated, the message is passed to a mobile or IP Gateway that provides the message to a payment processing network. The payment processing network includes a web server coupled to a database. The database contains data that may be used to respond to a user request for information or advice regarding some aspect of an intended or completed payment transaction. In response to the consumer's initial request for help, advice, or information, or to a subsequent request, the consumer may receive a list or menu of selectable topics regarding the intended or completed transaction. The list or menu may be determined based on characteristics of the transaction (such as type of merchant, amount of transaction, country of transaction, etc.), characteristics of the merchant involved in the transaction, or characteristics of the product or service involved in the transaction, for example.

Based on the list or menu, the consumer may select a topic or category for which they desire additional information, or for which they desire to take an action. As noted, the consumer's selection of a topic or category may be accompanied by the consumer providing one or more keywords that are entered into a data entry field. In some cases, the consumer may be assisted to create a query or search request using a tool that constructs a query based on characteristics of the transaction, the merchant, the consumer's preferences, the consumer's previous transactions, etc. The consumer selection and/or query is used to access desired data in the database, or to obtain data that is available from another data source (such as the Internet or a specialized database). The desired data is provided to the consumer via a suitable messaging service on their device. The invention enables a consumer to obtain additional information about a transaction in a timely manner, where they may use that information to change the transaction, to interact with a merchant with regards to the customer service they received during the transaction, or to take another action with regards to a transaction that they conducted or are intending to conduct. Note that although the request for advice or information has been described with reference to a SMS or other text-based message, it may also be requested and/or provided in the context of an interactive voice response system, phone call, or other audio format.

The database used to construct a response to the consumer's request(s) for help, advice, or information may contain information obtained from transactions performed by the consumer themselves and from other consumers. The data in the database may include data regarding the transactions, the merchants or service providers involved in the transactions (e.g., store locations, contact information for the manager of a store or a customer service representative), the products or services involved in the transactions (e.g., warranty, price comparisons for the same or similar products, contact information for the manufacturers, available rebates, etc.), responses to frequently asked questions (FAQs) about the merchant, service provider, product or service involved in a transaction, etc. The data contained in the database may be processed or "data mined" using any suitable data processing methods, functions or operations. Such methods, functions, or operations may include, neural network analysis, pattern matching, statistical analysis, application of an expert system, use of recommendation or collaborative filtering techniques, etc. The output of such processing or data mining techniques may be used to provide a consumer with a list or menu of available categories of information, and with answers to specific requests for information based on that list or menu.

As noted, embodiments of the invention are directed to payment transaction systems, apparatuses, and methods. In a typical payment transaction, a consumer uses a portable consumer device (e.g., a credit card, debit card, a mobile phone containing a contactless payment device, etc.) to purchase goods or services from a merchant. Prior to describing embodiments of the present invention in greater detail, a brief description of the elements involved in a payment transaction, and their role in the processing of the payment transaction, generating a transaction alert or message, and in responding to a consumer's request for advice or information will be presented.

FIG. 1 is a block diagram illustrating the primary functional elements of a system 20 for conducting a payment transaction and for generating advice or information regarding the transaction for a consumer, in accordance with some embodiments of the present invention. System 20 includes a merchant 22 and an acquirer 24 associated with the merchant 22. In a typical payment transaction, a consumer 30 may purchase goods or services from the merchant 22 using a portable consumer device 32, which may function as a payment device. The acquirer 24 can communicate with an issuer 28 via a payment processing system or payment processing network 26. The consumer 30 may receive an alert or other message which relates to the transaction, via a communication device 33. The alert or other message may be presented to the consumer by display of data in graphic or textual form using an interface of communication device 33, or by presentation of another suitable form of data (such as an audio signal or message played through an earpiece). In some embodiments, portable consumer device 32 may be embedded in, or otherwise incorporated into, communication device 33, where communication device 33 may take the form of a mobile phone that includes a contactless chip which may be used to conduct a payment transaction. Consumer 30 may be an individual, or an organization such as a business that is capable of purchasing goods or services.

Portable consumer device 32 may be of any form suitable for use in implementing the present invention. For example, suitable portable consumer devices can be hand-held and compact so that they can fit into a consumer's wallet and/or pocket (e.g., pocket-sized). Such devices may include contact or contactless smart cards, ordinary credit or debit cards (with a magnetic strip and without an embedded microprocessor), keychain devices (such as the Speedpass™ commercially available from Exxon-Mobil Corp.), etc. Other examples of suitable portable consumer devices include cellular phones, personal digital assistants (PDAs), pagers, payment cards, security cards, access cards, smart media, transponders, and the like, where such devices may include an embedded or incorporated contactless chip or similar element. The portable consumer devices can function as debit devices (e.g., a debit card), credit devices (e.g., a credit card), or stored value devices (e.g., a stored value or prepaid card). Communication device 33 may also be in any form suitable for use in implementing the present invention. For example, a suitable communication device 33 can be a wireless phone, a form of Smartphone, a computer (such as a portable computer or other computing device), PDA, pager, or other device. As mentioned, in some embodiments, a single device may comprise both portable consumer device 32 and communication device 33, such as the example of a wireless phone configured to conduct payment transactions (e.g., by virtue of having a contactless chip incorporated into the phone).

Payment processing network 26 (sometimes referred to as a payment processing system) may include data processing subsystems and networks that implement operations used to support and deliver authorization services, exception file services, and clearing and settlement services. An exemplary payment processing network may include VisaNet. Payment processing networks such as VisaNet are able to process credit card transactions, debit card transactions, and other types of commercial transactions. VisaNet, in particular, includes a VIP system (Visa Integrated Payments system) which processes authorization requests for transactions and a Base II system which performs clearing and settlement services for the transactions.

In some embodiments, the payment processing network may include, or be communicatively coupled to, an IP Gateway that couples the payment processing network to a message delivery channel. The IP gateway and delivery channel enable the delivery of messages among the parties to a transaction based on user preferences and if requested, advice or information regarding the transaction. Further, in some embodiments, the payment processing network may include, or be communicatively coupled to, a notification or alert generation engine that operates to determine whether to generate a notification or alert for a payment transaction. The notification or alert engine may also determine the contents of such a notification or alert. An example of an element that may perform some or all of the functions of a notification or alert engine is the advice engine to be described.

Payment processing network 26 may include a server computer. A server computer is typically a powerful computer or cluster of computers. For example, the server computer can be a large mainframe, a minicomputer cluster, or a group of servers functioning as a unit. In one example embodiment, the server computer may be a database server coupled to a Web server. Payment processing network 26 may use any suitable wired or wireless network, including the Internet, to facilitate communications and data transfer between the system elements depicted in the figure.

In some embodiments, payment processing network 26 may include, or be communicatively coupled to, an advice engine 45. Advice engine 45 may comprise a computing device, server computer, and/or a database and operates to provide consumer 30 with messages or other information that may be used by the consumer when conducting a payment transaction (and in some cases, when deciding whether to conduct a transaction). In particular, advice engine 45 may operate to provide a consumer with a menu or list of possible categories of information that are available with regards to a transaction, and to generate a message to the consumer containing information requested by the consumer. The computing device, server computer or other data processing apparatus that operates as advice engine 45 may comprise an electronic processor programmed with a set of instructions, where the set of instructions may be contained in a data storage device or memory that is communicatively coupled to the processor. When executed, the set of instructions may cause the programmed processor to implement some or all of the methods, processes, functions, or operations of the inventive transaction advice system.

The messages or information provided to the consumer may be part of a transaction alert process (such as one that notifies a consumer that their payment account has been used to conduct or to attempt to conduct a transaction) or may be part of a process for delivering specific types of information to a consumer. For example, advice engine 45 may include or have access to data (typically contained in a searchable or indexed database, or available from another source as the result of executing a search or query over the Internet, etc.) relating to, among other topics:

The product or service involved in the proposed or actual transaction (e.g., product descriptions, warranty information, product availability at other locations, product reviews, etc.);

The merchant involved in the proposed or actual transaction (e.g., merchant return policies, other merchant locations, the names of certain executives or employees of the merchant, contact information for the merchant, the merchant's customer service representatives, or the merchant's corporate parent, etc.);

Responses to frequently asked questions (FAQs) regarding the product, service, or merchant;

Price comparisons for the same or a similar product or service;

Information regarding available rebates for the product;

Information on how to obtain instruction manuals or demonstration videos for the product;

Transactions of other consumers involving the same or a similar product or service, and the comments or recommendations of those consumers; or Other information relevant to the product or service, to manufacturers or providers of the product or service, or other consumers' impressions of the product, service, manufacturer, service provider, merchant, etc.

As will be discussed, the data contained in the database may be provided by any suitable source, including but not limited to, keyword or other searches performed on the Internet, web-sites of the product manufacturer or merchant, the results of processing or performing "data mining" on multiple payment transactions, information provided by consumers other than the consumer conducting the payment transaction in the form of comments or product reviews accessible at a specified web-site, etc.

Advice engine 45 may be communicatively coupled to other elements of payment processing network 26, and as a result may receive or have access to information regarding or contained in an authorization request message, authorization response message, or other messages relating to transactions conducted by multiple consumers. Such information may enable advice engine 45 to determine data regarding a consumer or merchant involved in a transaction and based on that, to populate a database that may be used to enable consumers to obtain information of interest with regards to a transaction. This is a result of payment processing network 26 being involved in the processing of payment transaction data, including that provided by an acquirer or issuer. Thus, network 26 may collect and process transaction data for a multitude of consumers and merchants. The transaction data may also be used as a source for obtaining other data related to the merchants or to the products or services involved in a transaction, such as by performing a search for available information regarding a product or service and storing the results (or a link to the results) in a database containing transaction related information. The transaction data (or other data obtained as a result of the transaction data) may be processed or "data mined" to identify information of potential interest to consumers as a function of consumer demographics, transaction characteristics, merchant type, merchant location, product or product type, etc. This information may be used to provide a consumer with a menu of categories or types of information that are available, and to respond to requests from the consumer for specific information or for advice regarding a transaction or proposed transaction.

In exemplary embodiments, the inventive system that includes advice engine 45 may perform one or more actions, processes, functions, or operations to provide the consumer with information regarding a transaction. Such actions, processes, functions, or operations may include, but are not limited to, one or more of:

(1) providing a consumer with an alert or notification regarding a transaction, where the alert or notification may contain information or provide the consumer with an opportunity to request additional advice or information regarding the transaction, the product or merchant involved in the transaction, the manufacturer of the product, etc.;

(2) generating a menu or list of categories of advice or information that can be provided to the consumer in response to a request for additional advice or information regarding a transaction;

(3) generating a response to a request from the consumer for advice or information regarding a transaction, the product or service involved in a transaction, the merchant involved in a transaction, the manufacturer of the product, etc.;

(4) if a consumer's mobile payment or communications device is equipped with a location determining application, then the inventive system may be able to provide the consumer with directions to a location corresponding to a person or product referred to in the advice or information provided to the consumer;

(5) if a consumer's mobile payment or communications device is capable of displaying images or video, then providing the consumer with images or video that explain how to use a product, how to repair a product; or (6) providing a consumer with a means to contact a person or organization referred to in the advice or information provided to the consumer, such as by assisting the consumer to initiate a phone call or send a message (text, SMS, email, etc.) to a person or organization (such as a store manager, customer service representative of a product manufacturer, consumer protection agency representative, etc.).

In some embodiments, advice engine 45 may function as a notification engine which operates to generate or cause the generation of a message to be sent to consumer 30 (e.g., via communication device 33). The message may include relevant information regarding a transaction, such as the amount of the transaction, the merchant involved in the transaction, the product involved in the transaction (represented by a product code or description, for example), etc. The message may also (or instead) provide the consumer with an opportunity to request further information about the transaction, the product, the merchant, the product manufacturer, other consumers' reviews of the product or merchant, etc. In some embodiments, advice engine 45 may include, be part of, or be in communication with an IP Gateway that is coupled to the payment processing network 26. The IP Gateway functions to couple the payment processing system to one or more communication channels to enable the delivery of a message or messages to the consumer. In some embodiments, advice engine 45 may be part of the infrastructure of issuer 28 or of another party to a transaction, such as a payment processor or other element of a payment processing system or network.

As will be described, payment processing network 26, the IP Gateway, or an element of the issuer infrastructure may include an interface for use by the consumer to set preferences with regards to transaction alerts, message delivery channels, triggers for the generation of an alert or message, etc. Such preferences may then be used by advice engine 45 and/or an IP Gateway to arrange for the delivery of a message containing transaction or other information to the consumer. Further, the consumer preferences may be used with a database populated with data concerning product, merchant, manufacturer or other relevant information to generate a response to a consumer request for information or advice regarding a transaction.

Merchant 22 may receive communications or data from an access device 34 that can interact with portable consumer device 32. Examples of suitable access devices include point of sale (POS) devices or terminals, device readers for contact or contactless payment devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If access device 34 is a point of sale terminal, any suitable point of sale terminal may be used including card readers or other forms of payment device readers. Such card or payment device readers may include the capability to operate in any suitable contact or contactless mode of operation. For example, exemplary card readers or devices can include RF (radio frequency) antennas, NFC (near field communications) capable devices, magnetic stripe readers, etc. to enable interaction with portable consumer device 32.

Figure 2:
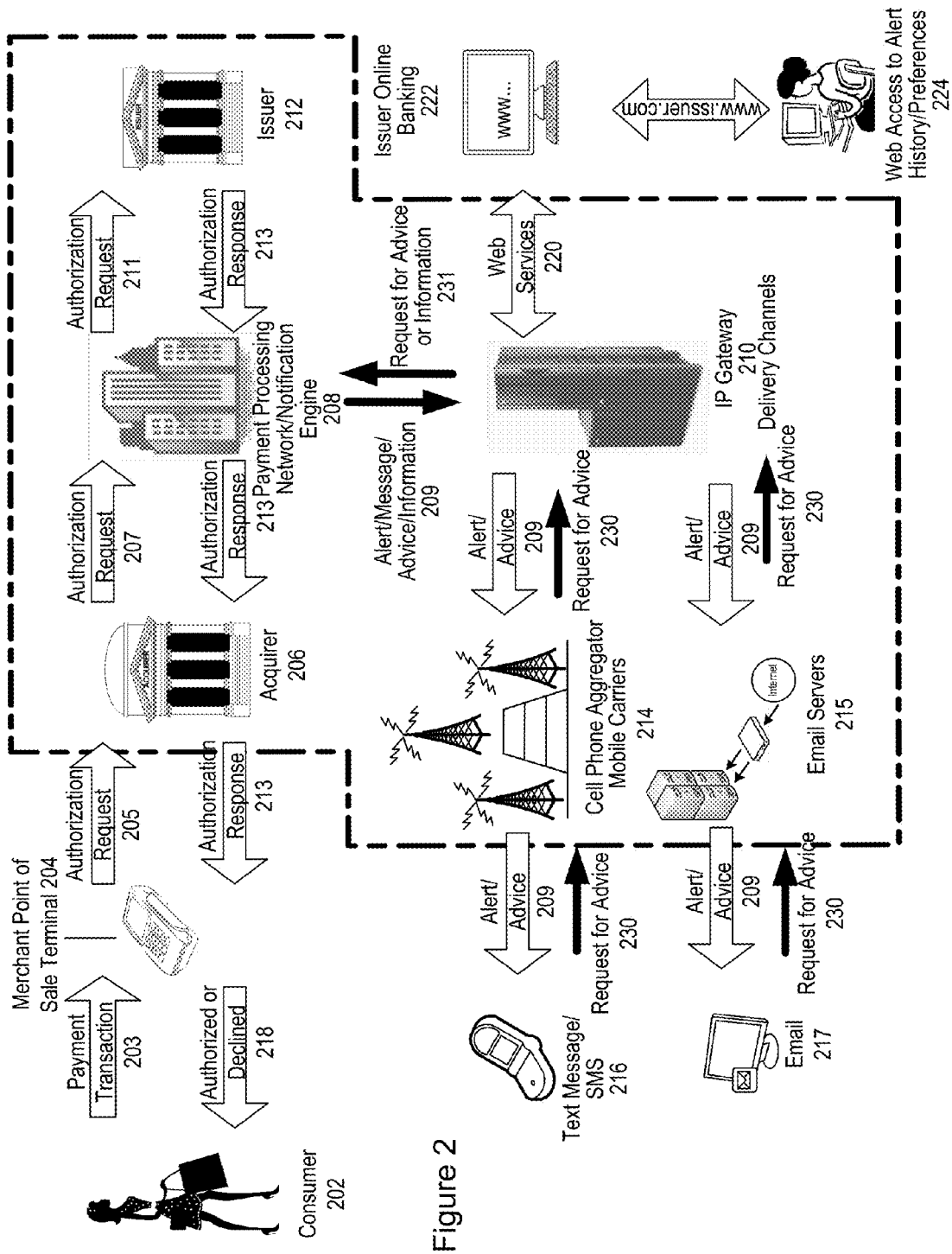
FIG. 2 is a diagram illustrating the elements of a payment transaction system and the associated transaction flow, which may be used to enable a consumer to conduct a payment transaction and to generate and deliver advice or information regarding the transaction to the consumer, in accordance with some embodiments of the present invention.

FIG. 2 is a diagram illustrating the elements of a payment transaction system and the associated transaction flow, which may be used to enable a consumer to conduct a payment transaction and to generate and deliver advice or information regarding the transaction to the consumer, in accordance with some embodiments of the present invention. As shown in the figure, in a typical purchase transaction, a consumer 202 purchases a good or service from a merchant by interacting with the merchant's point of sale terminal or device reader 204. The consumer may use a portable consumer device such as a credit card or debit card, or a payment device such as a contactless chip embedded in another device to conduct the transaction. For example, consumer 202 may take a credit card and may swipe it through an appropriate slot in the POS terminal. Alternatively, the POS terminal may be a contactless reader, and the portable consumer device may be a contactless device such as a contactless smart card or contactless chip embedded in another type of device.

In an exemplary transaction, consumer 202 initiates a payment transaction 203 using their payment device. The merchant's transaction processing system generates an authorization request message 205 that is forwarded to the acquirer 206. Acquirer 206 may process authorization request message 205 to obtain data for its records and/or to add relevant data to the message. Acquirer 206 forwards authorization request message 207 (which as described, may be the same as message 205 or may contain other data, including some or all of that contained in message 205) to payment processing network 208. In some embodiments, payment processing network 208 may include the capability to generate an alert, advice or other form of message 209 (such as by the notification engine depicted in the figure), a message routing system, and other elements responsible for payment transaction processing. Payment processing network 208 may also include, or be capable of communication and data exchange with an IP Gateway 210 which operates to control the delivery of alerts or messages to the consumer. As will be described in greater detail, the delivery of alerts or messages may be determined by one or more preferences established by the consumer, such as the selection of a preferred communications device based on location, time of day, type of transaction, etc. After receipt of authorization request message 207, payment processing network 208 may process the message to obtain data for its records and/or to add relevant data to the message. Payment processing network 208 then forwards authorization request message 211 to the issuer 212 of the consumer's payment device.

After issuer 212 receives authorization request message 211, issuer 212 processes the authorization request to determine whether to authorize the transaction, and sends an authorization response message 213 back to payment processing network 208 to indicate whether or not the current transaction is authorized. Issuer 212 may determine whether to authorize the transaction based on a transaction risk assessment or risk management process, consumer profile or transaction history data, merchant data, or other suitable information. Based on the contents of authorization response message 213 (and if relevant, other consumer or transaction related information), payment processing network 208 (or the notification engine component, or another element of the network) determines if an alert, message, or other form of communication 209 should be generated for the consumer with regards to the transaction. The determination of whether an alert, message, or other form of communication 209 should be generated may be based on characteristics of the transaction, consumer preferences with regards to the type of transactions for which they desire to be alerted (based on location, amount, merchant category, etc.), or other relevant data. As mentioned, such a determination may be made by a notification engine that is part of, or coupled to, payment processing network 208. The notification engine or other message generation component of payment processing network 208 may access one or more databases to obtain data needed to determine if a communication 209 should be sent, and to determine the contents of such a communication. As will be described in further detail, the invention may process transaction authorization messages, where such messages include authorization request messages and authorization response messages, to provide a range of added value services to consumers with regards to transaction related information and advice.

Note that a consumer's preferences with regards to when they desire to be alerted about a transaction or about the status of a transaction may be provided as a result of a web services interface 220. Web services interface 220 may, in coordination with an issuer or provider of banking services 222, provide a consumer with access to a data input interface, form, etc. to enable the consumer to specify under what situations or conditions they wish to receive an alert. Data input interface 224 may be part of a web-site accessed by a consumer that enables the consumer to register for a transaction alert service, view their transactions, view alerts generated for the transactions, and to set their desired preferences for triggering the generation of an alert or other form of message. The situations or conditions that trigger the generation of an alert may include characteristics of the transaction (e.g., the amount, if the transaction exceeds a threshold, if the transaction is for a specific type of good or service, if the transaction is with a specific type of merchant), if the transaction occurs in a specified location or outside of a specified location, characteristics of the authorization response (e.g., if the transaction is declined or if approval is conditioned on some event or data), or another suitable characteristic. Data input interface 224 may enable a consumer to access a record of transactions for the previous month (or for any other suitable time period) for which a transaction alert or message has been generated in order to review their preferences and alter them if desired. In some embodiments, a consumer may be sent an email or other form of communication on a regular basis that contains a record of all transactions and transaction alerts that were generated for a certain time period. By accessing a suitable data input interface, the consumer may review and if desired, alter their preferences with regards to triggering alerts, alert content, and alert delivery mechanisms.

If it is determined that an alert, message, or other form of communication 209 should be generated and provided to the consumer, then payment processing network 208 may use IP Gateway 210 to control the delivery of the alert, etc., where IP Gateway 210 operates to route the alert to the appropriate communications channel and ultimately to a communications device of the consumer. Based on consumer preferences and/or other factors, IP Gateway 210 may control the delivery of an alert or other message 209 to one of several communications channels and hence to one of several communications devices. For example, IP Gateway 210 may route an alert or message 209 to a mobile phone carrier 214 for delivery to a consumer's phone in the form of a text message (such as a SMS message) or interactive voice response (IVR) call 216. Similarly, IP Gateway 210 may route an alert 209 to an email server 215 for delivery to a consumer's computing device in the form of an email message 217.

Note that the alerts or messages 209 depicted in FIG. 2 may include one or both of transaction alerts and also messages containing advice or information provided in response to a request by a consumer. Such a request for advice or information 230 may be generated by a consumer using any suitable device and provided to payment processing network 208 via the intermediary of IP Gateway 210. IP Gateway 210 provides the request for advice or information 231 to payment processing network 208 which processes the request and in response generates a message containing the requested advice or information.

Payment processing network 208 may forward authorization response message 213 to acquirer 206. Acquirer 206 sends response message 213 to the merchant to inform the merchant if the transaction has been approved or if it has been denied. After the merchant receives the authorization response message, the approval or denial of the transaction 218 may be displayed to the consumer using the merchant's point of sale terminal 204, or may be provided to the consumer in another format.

An alert or other form of transaction notification may be generated in response to either or both of an authorization request message or an authorization response message. Further, information or advice may be provided to a consumer in response to a request from the consumer, where that request is received in response to an alert or other form of notification that is generated as the result of either or both of an authorization request message or an authorization response message. The inventive system may be used to provide advice or information to a consumer as they may need it during or subsequent to a payment transaction. For example, a consumer may want to know something about a product before completing a transaction, or may want to know the name of a contact person at a store after completion of the transaction. The inventive system provides a mechanism for assisting the consumer in both situations so that they may obtain the advice or information they desire.

At the end of the day (or another relevant time period), a clearing and settlement process can be conducted by payment processing network 208. A clearing process is a process of exchanging financial details between and acquirer and an issuer to facilitate posting to a consumer's account and reconciliation of the consumer's settlement position. Clearing and settlement can occur simultaneously or as separate processes or operations.

Figure 3:
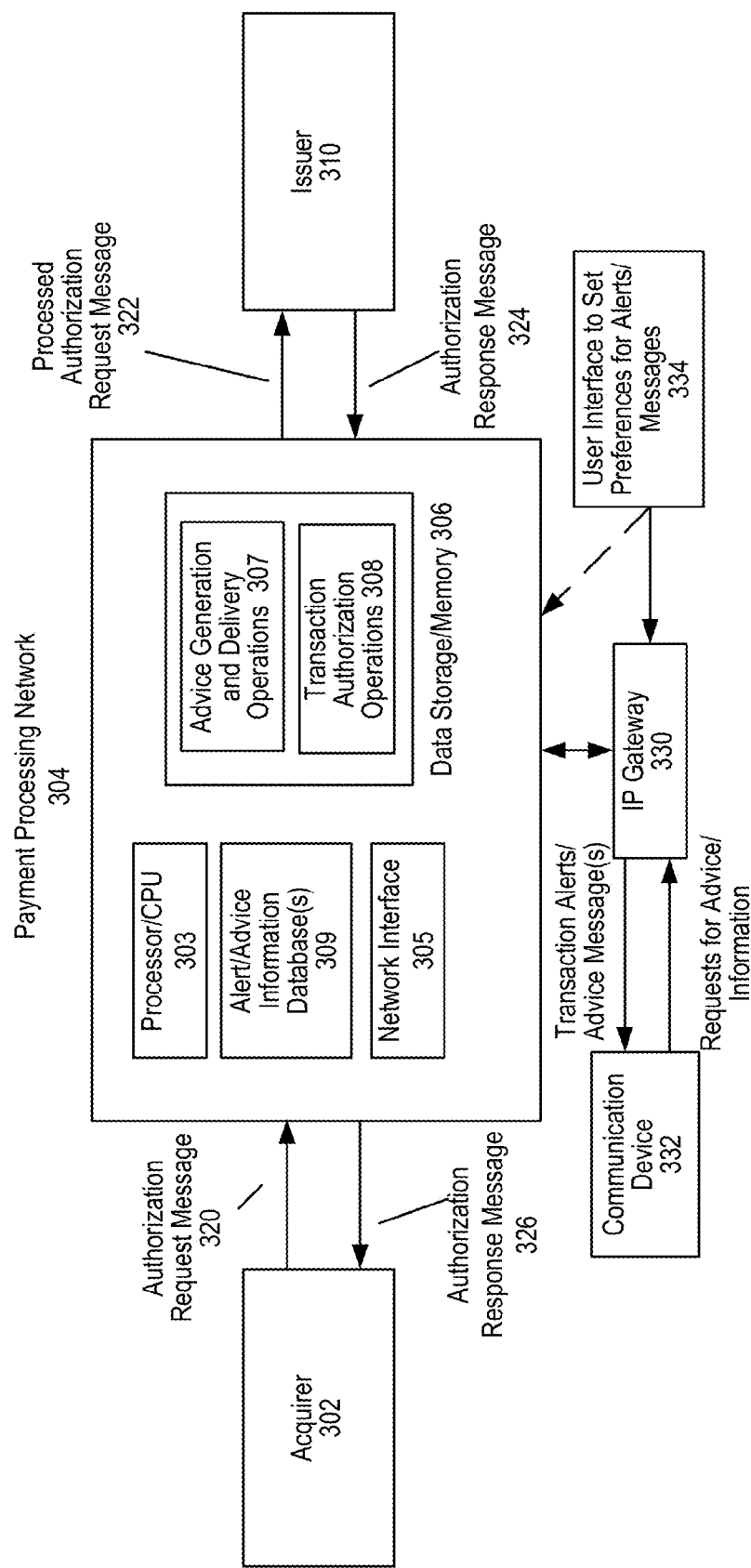
FIG. 3 is a functional block diagram illustrating components of a payment processing network (or payment processing system) and elements that may interact with that network to enable a consumer to conduct a payment transaction and to deliver an alert or other message to the consumer (such as one containing advice or information requested by the consumer), in accordance with some embodiments of the present invention.

FIG. 3 is a functional block diagram illustrating components of a payment processing network (or payment processing system) 304 and elements that may interact with that network to enable a consumer to conduct a payment transaction and to deliver an alert or other message to the consumer (such as one containing requested advice or information), in accordance with some embodiments of the present invention. As shown in the figure, elements that interact with network 304 include an acquirer 302 which provides an authorization request message 320 for a payment transaction to payment processing network 304. Payment processing network 304 may provide a processed authorization request message 322 to issuer 310 to assist issuer 310 in deciding whether to authorize or deny a transaction. Issuer 310 provides payment processing network 304 with an authorization response message 324 containing an indication of whether the transaction has been approved or denied. Authorization response message 326 (which may be the same as message 324, or may contain other information) is provided to acquirer 302 to inform acquirer 302 (and ultimately the merchant and consumer) if the transaction has been approved or denied.

In processing one or more of the transaction authorization messages, where such messages include transaction authorization request messages 320 and transaction authorization response messages 324, payment processing network 304 may utilize one or more of the components or elements depicted in FIG. 3. Such components or elements include a processor or central processing unit 303 that is programmed to execute a set of instructions, where some or all of those instructions may be stored in data storage device or memory 306. The instructions may include instructions which when executed, cause payment processing network 304 to perform one or more transaction authorization processing functions or operations (as suggested by instructions or instruction set 308) and/or transaction advice or transaction information message generation and delivery operations (as suggested by instructions or instruction set 307). In performing these operations, processor or central processing unit 303 may access one or more databases 309 containing data and information that may be used by payment processing network 304 to generate a response to a request from a consumer for advice or information regarding a transaction. Such data or information may include data regarding the consumer, the consumer's present transaction, the consumer's previous transactions, the transactions of other consumers, the merchant involved in the present transaction, the product or service involved in the present transaction, other merchants that may be able to provide the product or service involved in the present transaction, etc. Database(s) 309 may also contain data or information regarding the consumer's preferences with regards to the generation of transaction alerts and messages containing advice or information (such as the previously described consumer preferences for the generation, contents, and delivery of an alert or message regarding a transaction or a message containing a response to a consumer's request for advice or information regarding a transaction).

Payment processing network 304 may utilize network interface 305 to enable communication with other elements depicted in FIG. 3. Such elements may include IP Gateway 330 which operates to enable the delivery of a transaction alert or other message to a communication device 332 belonging to a consumer. IP Gateway 330 also enables the delivery of a request for advice or information from the consumer to payment processing network 304 in order to permit network 304 to generate a response to the consumer's request. As has been described, a consumer may access a user interface 334 to indicate their preferences for when an alert or message should be generated, the preferred contents of such an alert or message, and the preferred delivery channel for such an alert or message. Similarly, a consumer may access user interface 334 to indicate their preferences for the format, contents, and the preferred delivery channel for a message generated in response to a request from the consumer for advice or information regarding a transaction. Note that user interface 334 may provide information regarding a consumer's preferences to payment processing network 304 in addition to, or instead of to, IP Gateway 330 (as suggested by the dashed line between interface 334 and payment processing network 304).

Figure 4:
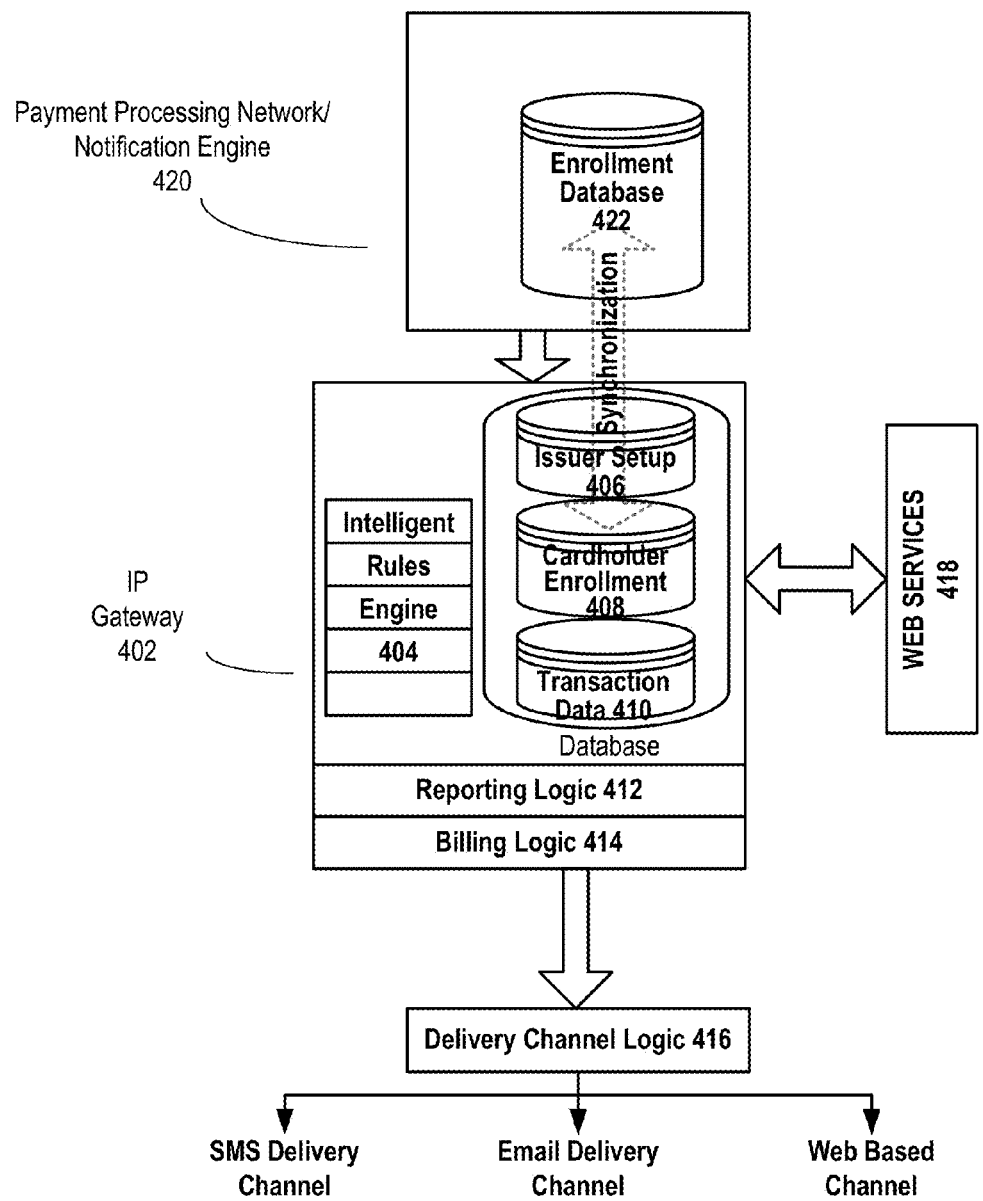
FIG. 4 is a functional block diagram illustrating components of an IP Gateway that may be used as part of a system to enable a consumer to conduct a payment transaction and to deliver an advice or information related message to the consumer, in accordance with some embodiments of the present invention.

FIG. 4 is a functional block diagram illustrating components of an IP Gateway 402 that may be used as part of a system to enable a consumer to conduct a payment transaction and to deliver an advice or information related message to the consumer, in accordance with some embodiments of the present invention. The figure also depicts how IP Gateway 402 may interface with other elements of the transaction alert and message generating architecture described with reference to FIGS. 2 and 3. In some embodiments, IP Gateway 402 can include programmed processors and/or server computers that include an intelligence/rules engine 404 (for determining how to handle alerts and transactions, based on specific transaction parameters and/or consumer preferences), and one or more databases for storing issuer information 406, cardholder enrollment data 408, and transaction data 410 (i.e., records of transactions and alerts). IP Gateway 402 can also include computer readable media and programmed processors for executing reporting and billing logic (shown as elements 412 and 414) and used for tasks such as reporting on billings, status, fraud, consumer data, etc. IP Gateway 402 may also include a messaging interface for implementing delivery channel logic 416. The messaging interface allows IP Gateway 402 to send and receive messages using any suitable communication channel, such as Text (SMS) messages, email, web based delivery, etc. IP Gateway 402 may further be capable of providing web services 418, for enabling access by a consumer using one or more web enabled browsers. For example, web services 418 can allow for the enrollment of consumers in the transaction alert and advice providing services, and the setting of consumer preferences for the generation, content, and delivery of alerts or messages. Enrollment may be performed by filling in fields on a website (one or more consumers at a time), or may be done in batch, by file delivery from an issuer or other party. The web services can further provide customer service functions for the consumer and the issuer. As described with reference to FIG. 2 and FIG. 3, IP Gateway 402 is coupled to and capable of communication and data transfer with payment processing network 420 which may include or be coupled to a notification engine (depicted as part of element 208 of FIG. 2 or element 304 of FIG. 3) and which is involved in the processing of transaction data and authorization messages (where such messages may include transaction authorization request messages and transaction authorization response messages). As shown in FIG. 4, payment processing network/notification engine 420 may include an enrollment database 422 that contains data concerning those consumers enrolled in an alert or advice providing service, with enrollment database 422 being synchronized with cardholder enrollment database 408 as needed to ensure that alerts are generated and requests for advice are responded to in accordance with consumers' preferences.

Figure 5A:
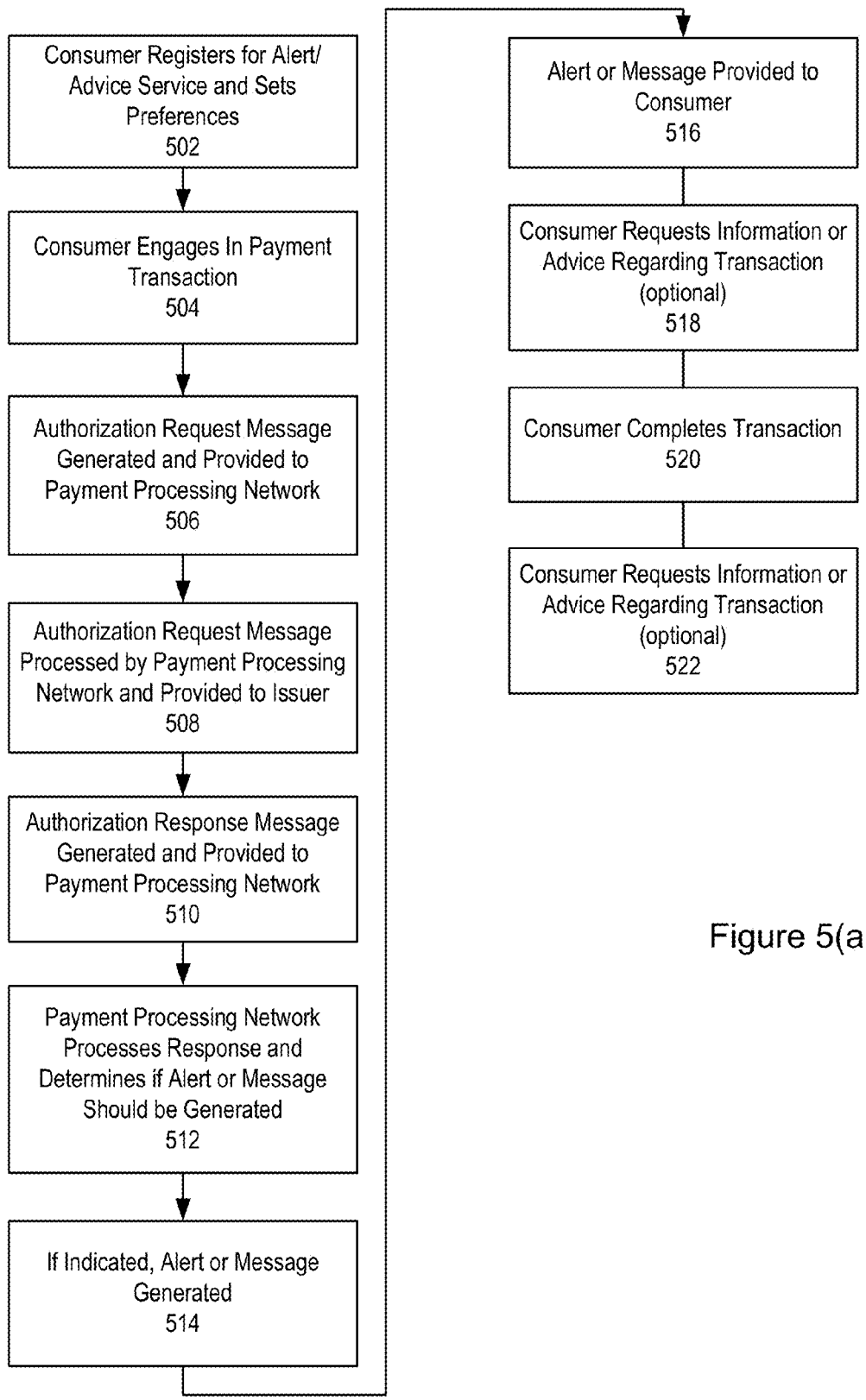
FIGS. 5(a) and 5(b) are flowcharts illustrating the stages or operations of a process for enabling a consumer to register for a transaction alert or advice service, conduct a transaction, and receive an alert or advice regarding the transaction, in accordance with some embodiments of the present invention.
Figure 5B:
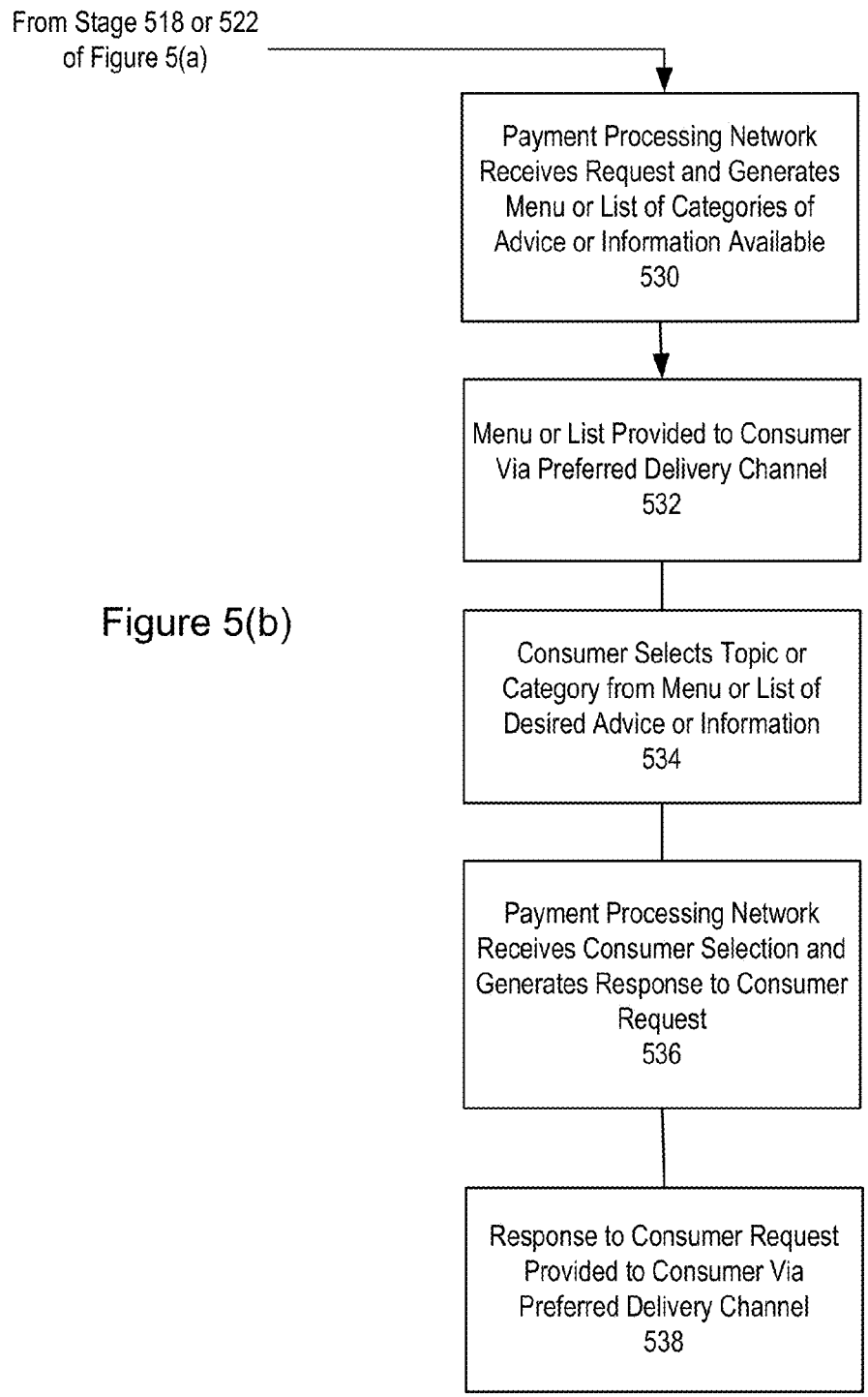

FIGS. 5(a) and 5(b) are flowcharts illustrating the stages or operations of a process for enabling a consumer to register for a transaction alert or advice service, conduct a transaction, and receive an alert or advice regarding the transaction, in accordance with some embodiments of the present invention. As shown in FIG. 5(a), a consumer registers for a transaction alert service in order to be provided with an alert or message when a transaction that satisfies the specified preferences or conditions is conducted by the consumer (stage 502). The consumer may also register (if required) for a service to provide advice or information regarding a transaction in response to a request for such advice or information. As part of the registration process, the consumer may specify the conditions under which they wish to be "alerted" to a transaction or to a characteristic of a transaction. These conditions may be provided using a web-site and suitable user interface that is configured to provide data to an IP Gateway or payment processing network. The conditions or triggers for the generation and sending of an alert may include characteristics of the transaction (e.g., the type or amount), characteristics of the merchant (e.g., the nature of the good or service provided, the merchant category or type), the location of the transaction, consumer specified indicia of fraud that the consumer wishes to be made aware of, etc. In addition to specifying their preferences with regards to the generation of an alert, a consumer may also specify their preferences with regards to how an alert is to be delivered to them (e.g., the alert or message format, the delivery channel, the consumer device to which the alert or message is to be delivered, times at which an alert or message should or should not be delivered, etc.). Further, the consumer may also specify what information they want to be contained in a transaction alert or message (e.g., a product or service code or identifier, a user interface element that may be activated to enable the consumer to obtain advice or information about the product, service, merchant, manufacturer, or transaction, etc.). The consumer preferences may be provided by entering data, selecting from a list of possible factors or conditions, checking a box to indicate the selection of a factor or condition, etc.

At some time after the consumer has set their preferences for the generation, delivery and content of an alert or message concerning a transaction, the consumer engages in a payment transaction using a payment device (stage 504). As described with reference to FIG. 2 and FIG. 3, this typically causes an authorization request message to be generated by a merchant and provided to the merchant's acquirer and then to a payment processing network (stage 506). The authorization request message may contain information regarding the merchant, such as a merchant type code (e.g., for a department store, restaurant, hotel, etc.), a merchant location code (which may correspond to a region or country), the amount of the transaction, etc. The authorization request message may be subjected to further processing by the payment processing network before being provided to the issuer (stage 508).

The issuer receives the authorization request message and processes the data contained in the message to determine if it will authorize the transaction. The issuer then generates an authorization response message and provides the message to the payment processing network (stage 510). The payment processing network processes the authorization response message and, based on the data contained in the message and the consumer's preferences, determines if an alert or message should be generated (stage 512) for the transaction. As discussed, the consumer's preferences may indicate that an alert or message should be generated based on one or more characteristics of the transaction that are specified by the consumer. Such characteristics may include, but are not limited to, the type of transaction, the amount of the transaction, the location of the transaction, whether there are specific features of the transaction that might suggest fraud, etc.

Figure 6:
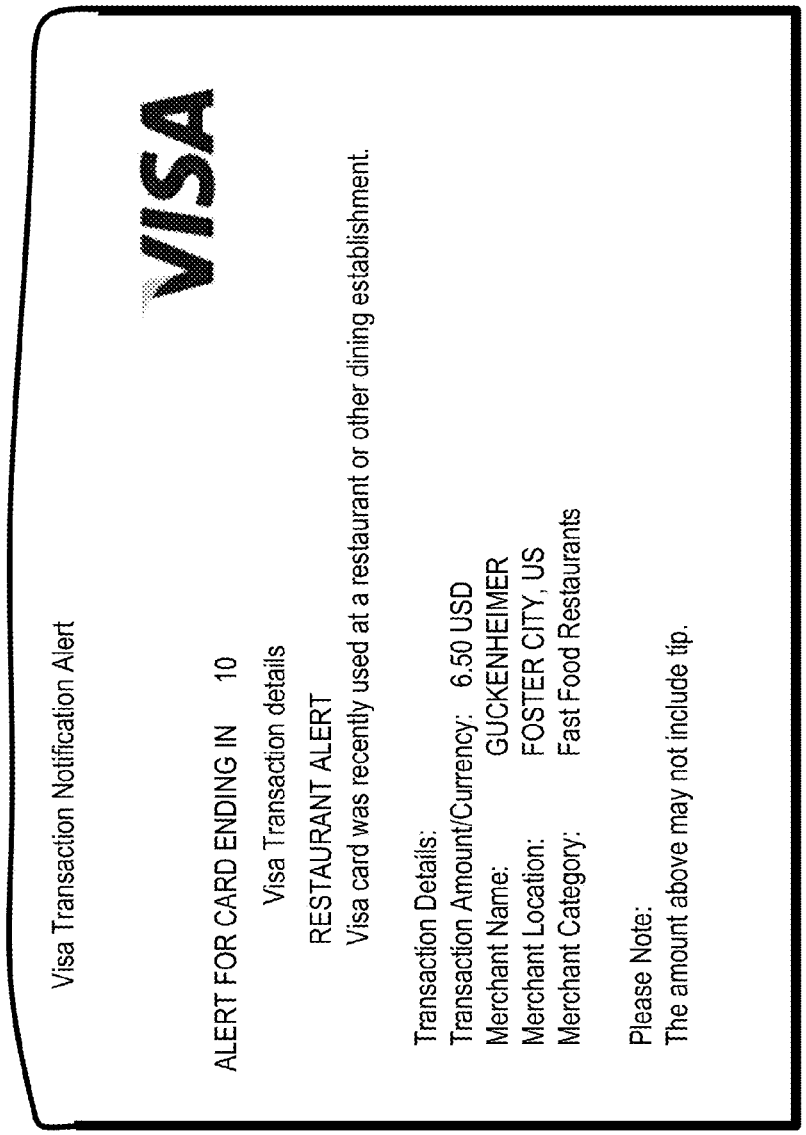
FIG. 6 illustrates an exemplary alert or message generated as the result of a transaction and provided to a consumer, in accordance with some embodiments of the present invention.

If the transaction data and the consumer's preferences indicate that an alert or message should be generated, then the payment processing network (which, as described may include or be coupled to a notification engine) generates the alert or message (stage 514). The alert or message may contain information concerning the transaction: for example, an identification of the payment account used for the transaction, an identification of the type of transaction (such as whether the transaction was conducted using a phone, online interface, etc.), the amount of the transaction, the merchant for the transaction, the location of the merchant, etc. An exemplary alert or message generated as the result of a transaction is shown in FIG. 6. Note that the contents of the alert or message may also be determined in whole or in part by the consumer's preferences, such as if the consumer desires that a transaction alert contain information about a product or service involved in a transaction. The alert or message is delivered in accordance with the consumer's preferences, for example, as a SMS message, email, web-page, phone call, or other form of communication. As shown in FIG. 6, an alert may provide a consumer with transaction and merchant information that may be relevant to a consumer determining if the transaction is fraudulent.

In addition to the transaction related information, the alert or message may also contain (depending on the consumer's preferences) information regarding actions that the consumer has requested be taken in response to specific transaction characteristics, or a selectable element that may be used by the consumer to request advice or information regarding the transaction (e.g., advice or information regarding the merchant, product, or service involved in the transaction). The alert or message is then provided to the consumer, with the delivery method or channel determined in whole or in part by the consumer's previously set preferences (stage 516). Typically, an IP Gateway is used to route the alert or message to the desired communication network for delivery to the consumer on the consumer's communication device or devices. Note that an opportunity to obtain advice or information regarding a transaction may also be provided to a consumer by means of a message separate from the transaction alert.

Figure 7:
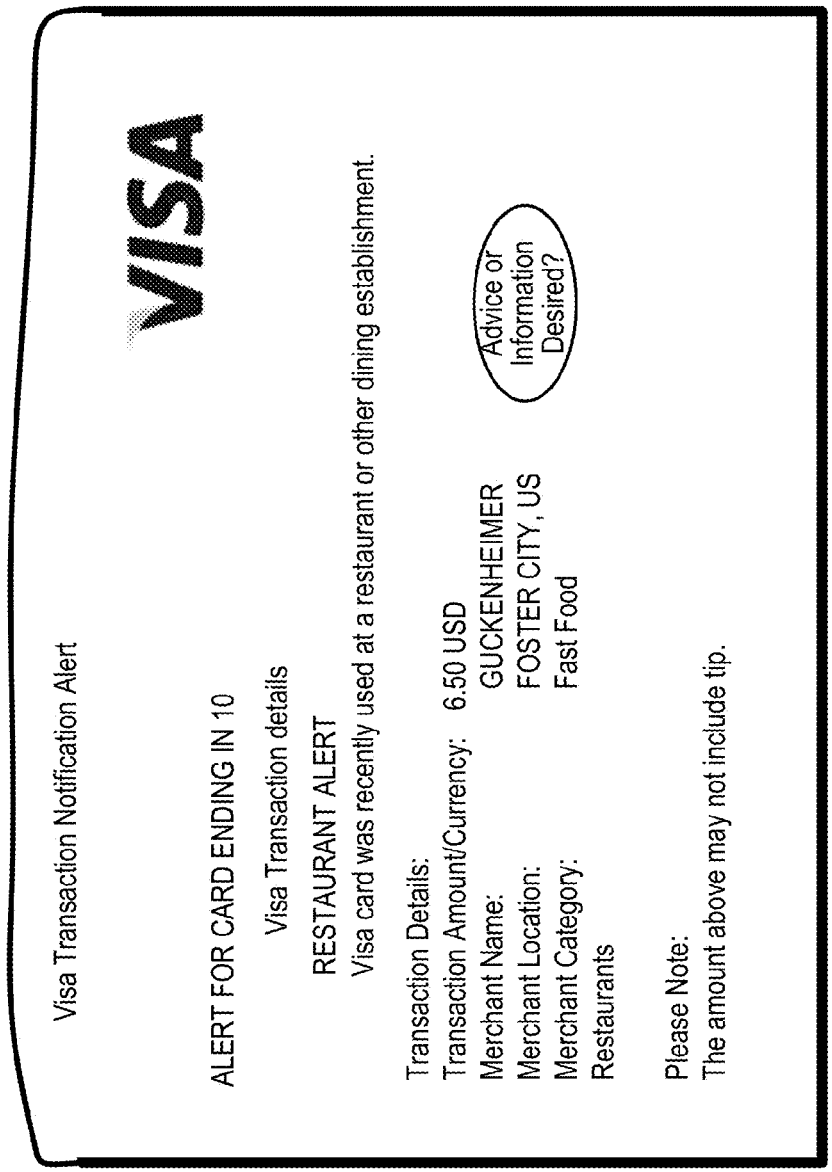
FIG. 7 illustrates an exemplary alert or message that includes an element that may be selected by a consumer to obtain assistance in obtaining advice or information regarding a transaction, in accordance with some embodiments of the present invention.

If the alert or message does not contain the advice or information desired by the consumer (or if the consumer desires other information), then the consumer may activate a "help", "advice", "need information" or similar element in the alert or message in order to request assistance (stage 518). FIG. 7 illustrates an exemplary alert or message that includes an element that may be selected by a consumer to obtain assistance in obtaining advice or information regarding a transaction, in accordance with some embodiments of the present invention. As shown in the figure, the alert or message may include a "button" or other form of element that may be selected or activated by the consumer to indicate that they desire to obtain advice or information regarding the transaction. As noted, the opportunity to obtain advice or information regarding the transaction may also be provided in a separate message from the alert message. Further, the opportunity to obtain advice or information regarding the transaction may be optional at this stage of the transaction, as the consumer may prefer to complete the transaction (stage 520) before being provided with or responding to a mechanism for obtaining the advice or information (as indicated at stage 522).

Regardless of the specific mechanism by which the consumer requests advice or information regarding the transaction, or at what stage of the transaction the request is generated, the request is provided to the IP gateway (as a result of the IP gateway being capable of communication and data transfer with a communications network that is used by the consumer's communication device) and then to the payment processing network for processing and the generation of a response. The response may take the form of specific advice or information (such as that specified as being desired by the consumer when setting their preferences), or the payment processing network may provide the consumer with a menu, list, or other set of selectable elements that represent the types or categories of advice or information that are available to the consumer. Instead of using a selectable element and a menu, in some embodiments, the consumer may send a message (such as a SMS message) that contains keywords recognized by the payment processing system or network and that correspond to a request for advice or information (e.g., "product warranty", or "product comparison"). In other cases the consumer may call (or activate a selectable element to call) an interactive voice response system that may be used to provide the consumer with requested advice or information, either directly or through use of a suitable menu. In any case, upon receipt of the request the payment processing network may provide the consumer with specific information or with a menu or list from which the consumer can generate a further request for the information they desire.

The payment processing network generates a response to the consumer's request that includes the advice or information that the consumer has indicated that they want with regards to the transaction, the merchant involved in the transaction, the product or service involved in the transaction, etc. Typically, the response will be constructed based on information contained in the consumer's preferences and/or data contained in a database that stores transaction and product related data (or a link to, or other method of obtaining that data). Further, preparation of the response may cause the inventive system to implement a process to obtain the requested data, such as by executing a search over the Internet or another suitable source of information. In some embodiments, the consumer may be provided with a data entry field in which a keyword or keywords may be entered, with those keyword(s) being used to determine what menu or topic categories, or what specific information within a selected menu or topic category, to provide to the consumer.

FIG. 5(b) is a flowchart illustrating the stages or operations of a process for responding to a consumer's request for advice or information regarding a transaction by generating a response message containing the advice or information. As shown in the figure, the process or method depicted in the figure is executed in response to a consumer requesting information or advice regarding a transaction (as indicated at stages 518 or 522 of FIG. 5(a)). In some embodiments, the payment processing network receives the consumer request and generates a menu or list of categories of advice or information that are available (stage 530). The menu or list is then provided to the consumer on the consumer's preferred device via the preferred delivery channel (stage 532). In response to receiving the menu or list, the consumer selects the topic or category of advice or information that they desire (stage 534). The payment processing network receives the consumer's selection, and in response generates a message containing the advice or information the consumer requested (stage 536). The generated message is then provided to the consumer on the consumer's preferred device via the preferred delivery channel (stage 538).

Note that the message generated in response to the consumer's request or selection of a category of advice or information may include one or more of a list or sub-menu indicating related topics or categories of available advice or information, specific data or information in response to the request, a link to a web-site from which the consumer may obtain specific data or information in response to the request, a request for clarification as to the specific advice or information desired by the consumer, a text or data entry field in which to submit search terms for execution of a search to obtain specific data or information in response to the request, etc. Similarly, the initial transaction alert may also contain a text or data entry field in which keyword(s) may be entered, with those keyword(s) being used to determine the topics or categories of available advice or information that are provided to the consumer.

In processing the consumer's request for advice or information, the inventive system may access one or more databases that contain information regarding the transaction, the product or service involved in the transaction, the merchant, the product manufacturer, etc. This data may be resident in the database or accessible by a web-site or other location indexed in the database. The database may also contain data used to generate the menu or list provided to the consumer, with the menu or list contents dependent upon the transaction, the merchant, the product manufacturer, etc. The data contained in the database or links to data may be obtained as the result of the processing of payment transactions for the consumer or for other consumers, the execution of a search or searches over the Internet to identify data and web-sites of interest, the use of a web page crawler or search "bot", etc.

As described, embodiments of the inventive system, apparatuses, and methods can provide a consumer with added-value services and benefits with regards to a transaction, including, but not limited to:

(1) providing information regarding a product, merchant, manufacturer, or other aspect of a transaction as part of an alert or message sent to the consumer in response to a transaction authorization response message for a payment transaction from an issuer;

(2) providing a mechanism in the alert or message for the consumer to request advice or information (or additional advice or information) about the transaction, and in response to the consumer request, provide the consumer with the requested information; and (3) providing the consumer with a web interface and/or other mechanism to enable the consumer to register for the inventive transaction advice or information service and to set the consumer's preferences for when they wish to be notified about a transaction, how they wish to be notified about the transaction, and the desired contents of the notification alert or other messages.

As described, in exemplary embodiments, an alert or message can be generated for a transaction based on preferences set by a consumer. The alert or message can include relevant information for the transaction. The relevant information can be sent to consumers that have registered for an alerts program. The relevant information can be sent as part of a transaction alert or in a stand alone message. The relevant information may include an element that the consumer can select to obtain advice or information regarding some aspect of the transaction. The relevant information may instead or also include advice or information that the consumer has indicated they want included with the alert or message (such as a link to the product manufacturer's web-site, contact information for the product manufacturer or merchant, a link to a web-site where product comparison data is available, etc.). In exemplary embodiments, the alert can be a text message sent to a wireless phone associated with the consumer (e.g. using SMS). In some embodiments the alert may comprise an email, instant message, voice message, or use any other suitable communications channel.

Figure 8A:
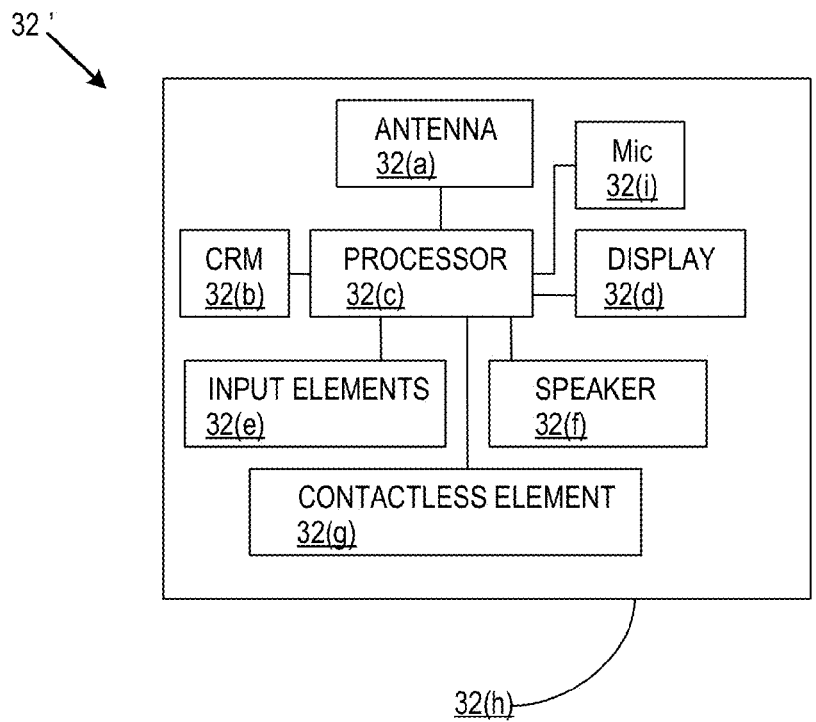
FIGS. 8(a) and 8(b) are block diagrams illustrating exemplary portable consumer devices or portable payment devices that may be used to conduct a transaction and enable a consumer to receive advice or information regarding the transaction, in accordance with some embodiments of the present invention.
Figure 8B:
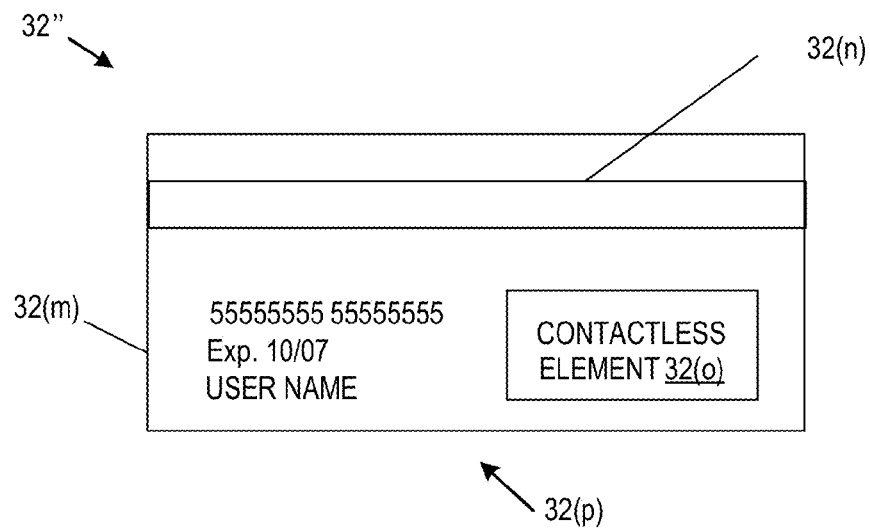

The inventive processes, functions, operations, and methods for delivering advice or information regarding a transaction to a consumer may be utilized in situations where the consumer uses one of a variety of portable consumer devices or portable payment devices to conduct a transaction. FIGS. 8(a) and 8(b) are block diagrams illustrating exemplary portable consumer devices or portable payment devices that may be used to conduct a transaction in which a consumer receives advice or information regarding the transaction, in accordance with some embodiments of the present invention.

As noted, the portable consumer device 32 shown in FIG. 1 may be in any suitable form. As discussed, suitable portable consumer devices can be hand-held and compact so that they can fit into a consumer's wallet and/or pocket (e.g., pocket-sized). They may include smart cards (with or without an embedded contactless element), credit or debit cards (with a magnetic strip and without a microprocessor), keychain devices (such as the Speedpass™ commercially available from Exxon-Mobil Corp.), etc. Other examples of portable consumer devices include those containing a contactless element such as a cellular phone (e.g., the wireless phone 32' described below), a personal digital assistant (PDA), or a pager. Suitable portable consumer devices also include payment cards, security cards, access cards, smart media, transponders, and the like. The portable consumer devices may function as a debit device (e.g., a debit card), a credit device (e.g., a credit card), or a stored value device (e.g., a prepaid or stored value card).

An exemplary portable consumer device 32' in the form of a phone may comprise a computer readable medium and a body as shown in FIG. 8(a). Note that communication device 33 of FIG. 1 may comprise the portable consumer device 32', such as the situation in which the communication device is a mobile phone that incorporates a contactless element. Note further that FIG. 8(a) shows a number of components, and that the portable consumer devices used in implementing embodiments of the present invention may comprise any suitable combination or subset of such components. The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, uniquely derived keys, encryption algorithms, etc. The memory may also store information such as financial information, transit information (e.g., a subway or train pass), access information (e.g., as in access badges), etc. Financial information may include information such as bank account information, bank identification number (BIN), credit or debit card number information (e.g., the primary account number or PAN), account balance information, expiration date, consumer information such as name, date of birth, etc. Any of this information may be transmitted or otherwise provided by the portable consumer device 32' as part of conducting a transaction.

Information in the memory of the device may also be in the form of data tracks, such as those traditionally associated with credit cards. Such tracks may include Track 1 and Track 2. Track 1 (which may be referred to as the "International Air Transport Association" track) stores more information than Track 2, and contains the cardholder's name as well as account number and other discretionary data. This track is sometimes used by the airlines when securing reservations with a credit card. Track 2 (which may be referred to as the "American Banking Association" track) is currently the most commonly used data track. This is the track that is read by ATMs and credit card checkers. The ABA (American Banking Association) designed the specifications of this track and all world banks are expected to abide by it. It contains the cardholder's account, encrypted PIN, plus other discretionary data.

The portable consumer device 32' may further include a contactless element 32(g), which is typically implemented in the form of a semiconductor chip (or other data storage element) with an associated wireless transfer (e.g., data transmission) element, such as an antenna or transducer. Contactless element 32(g) is associated with (e.g., embedded within) portable consumer device 32' and in some embodiments, data or control instructions transmitted via a cellular network may be applied to contactless element 32(g) by means of a contactless element interface (not shown). If present, the contactless element interface functions to permit the exchange of data and/or control instructions between the portable consumer device circuitry (and hence the cellular network) and an optional contactless element 32(g).

Contactless element 32(g) may be capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32' and a device reader or point of sale terminal. Thus, in some embodiments, portable consumer device 32' may be capable of communicating and transferring data and/or control instructions via both a cellular network and a near field or short range communications capability.

Portable consumer device 32' may also include a processor 32(c) (e.g., a microprocessor or central processing unit) for processing instructions that cause the execution of the functions and operations of the portable consumer device 32, and a display 32(d) to allow a consumer to see phone numbers and other information and messages (such as tip alerts or related messages). Portable consumer device 32' may further include input elements 32(e) to allow a consumer to input information into the device, a speaker 32(f) to allow the consumer to hear voice communications, music, etc., and a microphone 32(i) to allow the consumer to transmit voice inputs through the portable consumer device 32. Portable consumer device 32' may also include an antenna 32(a) for wireless data transfer (e.g., data transmission using a wireless communications or cellular network).

If the portable consumer device is in the form of a debit, credit, or smartcard, then the portable consumer device may optionally have features such as a magnetic strip. As a result, such devices may be capable of operating in either a contact or contactless mode.

An example of a portable consumer device 32" in the form of a card is shown in FIG. 8(b). FIG. 8(b) shows a portable device that includes a substrate 32(m). A contactless element 32(o) for interfacing with an access device 34 may be present on or embedded within substrate 32(m). Consumer information 32(p) such as an account number, expiration date, and consumer name may be printed or embossed on the card. A magnetic stripe 32(n) may also be on the substrate 32(m). The magnetic strip may contain one or more of the data tracks previously described as Track 1 format or Track 2 format.

As shown in FIG. 8(b), portable consumer device 32" may include both a magnetic stripe 32(n) and a contactless element 32(o). In other embodiments, either the magnetic stripe 32(n) or the contactless element 32(o) may be present as part of portable consumer device 32".

Figure 9:
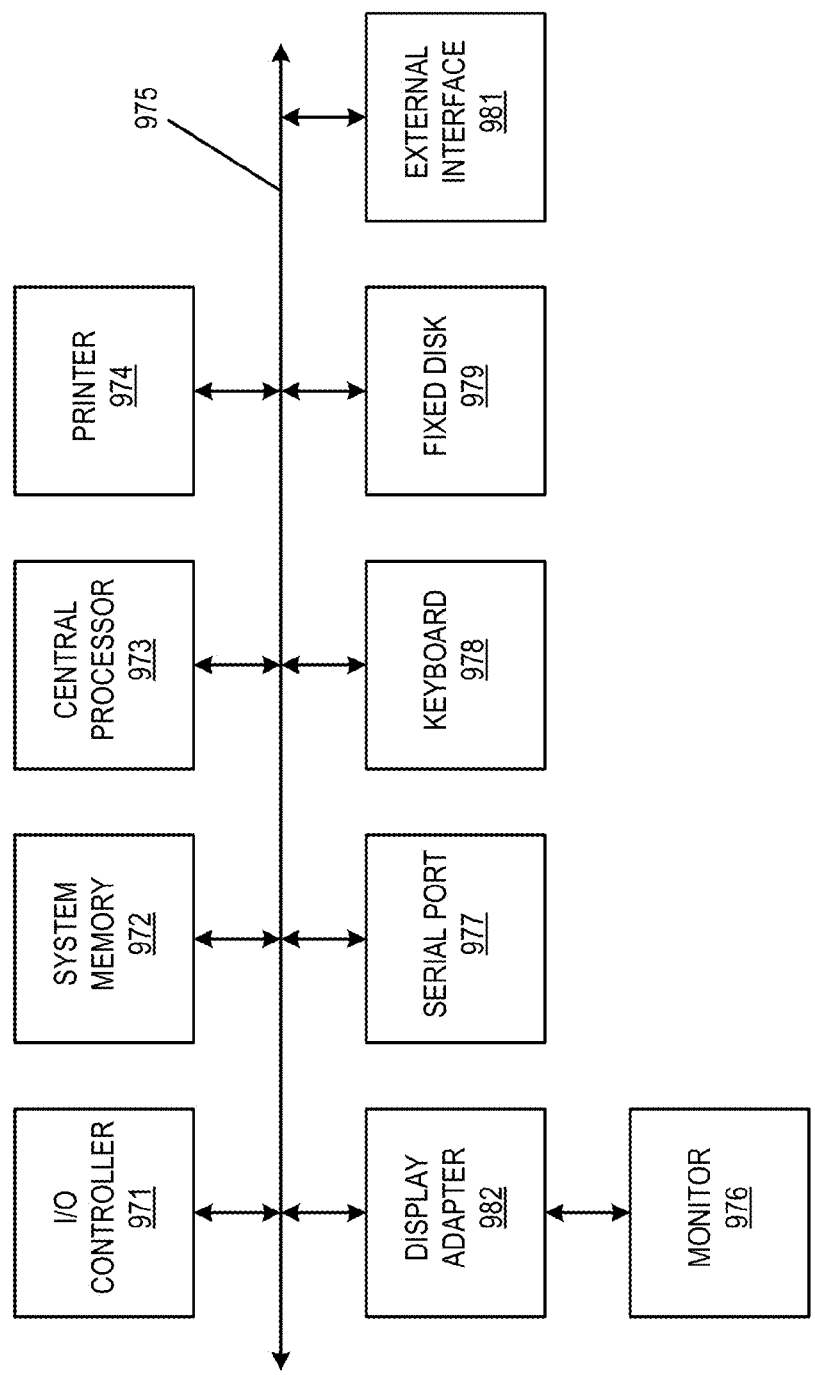
FIG. 9 is a block diagram illustrating the primary functional components of a computer or computing system that may be used to implement an element or component used in some embodiments of the present invention.

The various components, entities, and elements depicted in FIGS. 1-4 may operate one or more computers or computing apparatuses to facilitate the functions and operations described herein as part of the inventive system. Some or all of the components of the computing apparatus to be described with reference to FIG. 9 may be part of a server, group of servers, data processor, computer, or computing device that is part of a payment processing network, notification engine, IP Gateway, advice engine, etc. which implement one or more of the functions, processes, methods, or operations of the advice or information service of the present invention. The elements depicted in FIGS. 1-4, including any servers or databases, may use any suitable number of subsystems to facilitate the functions described herein. Examples of such subsystems or components are shown in FIG. 9, which is a block diagram illustrating the primary functional components of a computer or computing system that may be used to implement an embodiment of the present invention. The subsystems shown in FIG. 9 are interconnected via a system bus 975. Additional subsystems such as a printer 974, keyboard 978, fixed disk 979 (or other memory comprising computer readable media), monitor 976, which is coupled to display adapter 982, and others are shown. Peripherals and input/output (I/O) devices, which couple to I/O controller 971 (which can be a processor or other suitable controller), can be connected to the computer system by any number of means known in the art, such as serial port 977. For example, serial port 977 or external interface 981 can be used to connect the computer apparatus to a wide area network such as the Internet, a mouse input device, or a scanner. The interconnection via system bus allows the central processor (which take the form of a central processing unit or microprocessor) 973 to communicate with each subsystem and to control the execution of instructions from system memory 972 or the fixed disk 979, as well as the exchange of information between subsystems. The system memory 972 and/or the fixed disk 979 may embody a computer readable medium.

Embodiments of the invention are not limited to the above-described embodiments. For example, although separate functional blocks are shown for an issuer, payment processing system, IP Gateway, and acquirer, some entities perform multiple of these functions and may be included in embodiments of the invention. Further, as has been described, in a typical embodiment of the present invention, an apparatus such as an electronic processor is communicatively coupled to a data storage device which contains a set of instructions that may be executed by the processor when it is programmed. When executed, the instructions cause the programmed processor to implement the methods, processes, functions and operations described herein.

Embodiments of the present invention provide a consumer with advice or information related to a transaction, where such advice or information may relate to a product or service that is the subject of the transaction, the provider of the product or service, the manufacturer of the product, etc. The invention can assist a consumer to obtain advice or information such as the contact information for a merchant or customer service representative, product warranty or rebate information, reviews of a product or service by other consumers, information on the availability of a product or service form other merchants, and the price of the product or service at other merchants, etc. This can improve consumer satisfaction with payment transactions, and may act to expedite or increase such transactions. The inventive service may also enable product manufacturers or merchants to provide added-value services which are easily accessible by consumers, such as rewards programs, rebates, etc. The advice or information may be provided to the consumer before completion of the transaction or after completion of the transaction. This allows a consumer to receive a transaction alert message and respond to it with a request for advice or information at the consumer's convenience or when a need arises.

Specific details regarding some of the above-described aspects are provided above. The specific details of the aspects may be combined in any suitable manner without departing from the spirit and scope of embodiments of the invention. For example, portable consumer device authentication, consumer authentication, back end processing, and consumer transaction notification may be combined or partially combined in some embodiments of the invention. However, other embodiments of the invention may be directed to specific embodiments relating to each individual aspect, or specific combinations of these individual aspects.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. An apparatus for processing a payment transaction, comprising:
   an electronic processor programmed to execute a set of instructions;
   a data storage device coupled to the processor; and
   the set of instructions contained in the data storage device, wherein when the set of instructions are executed by the processor, the apparatus processes the payment transaction by
   receiving an authorization message for the payment transaction;
   processing the authorization message to determine if data contained in the message satisfies a condition specified by a consumer participating in the payment transaction for generating a transaction alert message regarding the payment transaction;
   generating the transaction alert message;
   providing the transaction alert message to the consumer participating in the payment transaction;
   receiving a request from the consumer for additional information regarding the payment transaction;
   processing the request from the consumer to determine the additional information regarding the payment transaction that can be provided to the consumer, wherein the additional information is information that is not included in the authorization message or in the transaction alert message;
   generating a response message comprising the additional information in response to the request from the consumer; and providing the response message comprising the additional information to the consumer.

2. The apparatus of claim 1, wherein receiving the request from the consumer for additional information regarding the payment transaction further comprises receiving a search term entered into a data entry field that is included with the transaction alert message.

3. The apparatus of claim 1, wherein receiving the request from the consumer for additional information regarding the payment transaction further comprises receiving an indication that the consumer has selected a selectable element that is included with the transaction alert message.

4. The apparatus of claim 1, wherein processing the request from the consumer to determine the additional information regarding the payment transaction that can be provided to the consumer further comprises generating a menu or list of types or categories of information available regarding the payment transaction.

5. The apparatus of claim 4, wherein the types or categories of information available include one or more of
information concerning the product or service that is the object of the payment transaction;
information concerning a merchant or service provider that is a party to the payment transaction; or
information concerning a manufacturer of the product or a supplier of the service that is the object of the transaction.

6. The apparatus of claim 4, wherein the apparatus further processes the payment transaction by
receiving a selection from the consumer of an item from the list or menu provided to the consumer;
processing the received selection to determine information responsive to the selection; and
providing the determined information to the consumer.

7. The apparatus of claim 6, wherein receiving the selection from the consumer of the item from the list or menu further comprises receiving a search term entered into a data entry field that is included with the list or menu.

8. The apparatus of claim 6, wherein the determined information provided to the consumer includes a selectable element, which when selected retrieves data from a communications network.

9. The apparatus of claim 6, wherein the determined information provided to the consumer includes a selectable element, which when selected places a phone call.

10. The apparatus of claim 6, wherein the determined information provided to the consumer includes a selectable element, which when selected generates a message.

11. The apparatus of claim 1, wherein providing the additional information to the consumer further comprises providing the additional information to the consumer on the consumer's mobile communications device.

12. The apparatus of claim 11, wherein the mobile communications device is a mobile phone or a personal digital assistant.

13. A method of processing a payment transaction, comprising:
receiving an authorization message for the payment transaction;
processing the authorization message using an electronic processor to determine if data contained in the message satisfies a condition specified by a consumer participating in the payment transaction for generating a transaction alert message regarding the payment transaction;
operating the electronic processor to generate the transaction alert message;
providing the transaction alert message to the consumer participating in the payment transaction;
receiving a request from the consumer for additional information regarding the payment transaction;
processing the request from the consumer to determine the additional information regarding the payment transaction that can be provided to the consumer, the additional information being information that is not included in the authorization message or in the transaction alert message;
generating a response message comprising the additional information in response to the request from the consumer; and
providing the response message comprising the additional information to the consumer.

14. The method of claim 13, wherein receiving the request from the consumer for additional information regarding the payment transaction further comprises receiving a search term entered into a data entry field, where the data entry field is included with the transaction alert message.

15. The method of claim 13, wherein receiving the request from the consumer for additional information regarding the payment transaction further comprises receiving an indication that the consumer has selected a selectable element that is included with the transaction alert message.

16. The method of claim 13, wherein processing the request from the consumer to determine the additional information regarding the payment transaction that can be provided to the consumer further comprises generating a menu or list of types or categories of information available regarding the payment transaction.

17. The method of claim 16, wherein the types or categories of information available include one or more of information concerning the product or service that is the object of the payment transaction;
information concerning a merchant or service provider that is a party to the payment transaction; or
information concerning a manufacturer of the product or a supplier of the service that is the object of the transaction.

18. The method of claim 16, further comprising:
receiving a selection from the consumer of an item from the list or menu provided to the consumer;
processing the received selection to determine information responsive to the selection; and
providing the determined information to the consumer.

19. The method of claim 13, wherein providing the additional information to the consumer further comprises providing the additional information to the consumer on the consumer's mobile communications device.

20. The method of claim 19, wherein the mobile communications device is a mobile phone or a personal digital assistant.

21. The apparatus of claim 7, wherein processing the request from the consumer to determine the additional information regarding the payment transaction that can be provided to the consumer further comprises executing a search on the internet for the search term.

22. The apparatus of claim 1, wherein the additional information is a link to a web-site.

* * * * *